(12) United States Patent
Gundavelli et al.

(10) Patent No.: US 12,500,752 B2
(45) Date of Patent: Dec. 16, 2025

(54) SYSTEM CONFIGURATION BASED ON SMART CONTRACTS

(71) Applicant: PAYPAL, INC., San Jose, CA (US)

(72) Inventors: Suryatej Gundavelli, San Jose, CA (US); Michael Jim Tien Chan, San Jose, CA (US); Mehak Jethmalani, Jersey City, NJ (US); Oluwatomisin Olayemi Jenrola, Toronto (CA); Stephanie Rose Desanges, Westwood, MA (US); Oliver Vanzant, New York, NY (US)

(73) Assignee: PAYPAL, INC., San Jose, CA (US)

( * ) Notice: Subject to any disclaimer, the term of this patent is extended or adjusted under 35 U.S.C. 154(b) by 331 days.

(21) Appl. No.: 17/895,595

(22) Filed: Aug. 25, 2022

(65) Prior Publication Data

US 2024/0073014 A1 Feb. 29, 2024

(51) Int. Cl.
*H04L 9/08* (2006.01)
*H04L 9/00* (2022.01)

(52) U.S. Cl.
CPC ............ *H04L 9/088* (2013.01); *H04L 9/50* (2022.05); *G06Q 2230/00* (2013.01)

(58) Field of Classification Search
CPC ........ H04L 9/088; H04L 9/50; G06Q 2230/00
See application file for complete search history.

(56) References Cited

U.S. PATENT DOCUMENTS

| | | | | |
|---|---|---|---|---|
| 10,824,747 | B1* | 11/2020 | Magerkurth | H04L 63/102 |
| 2019/0164153 | A1* | 5/2019 | Agrawal | G06Q 20/065 |
| 2020/0007322 | A1* | 1/2020 | Weldemariam | G06F 16/1805 |
| 2020/0082399 | A1* | 3/2020 | Deshpande | H04L 9/3297 |
| 2020/0177579 | A1* | 6/2020 | Allen | H04L 9/3239 |
| 2020/0234257 | A1* | 7/2020 | Mallik | G06Q 20/367 |
| 2020/0342092 | A1* | 10/2020 | Wei | G06F 21/6218 |
| 2020/0396065 | A1* | 12/2020 | Gutierrez-Sheris | H04L 9/3297 |
| 2021/0385084 | A1* | 12/2021 | Riveret | G06Q 50/04 |
| 2023/0130182 | A1* | 4/2023 | Mir | H04L 9/3297 713/189 |

OTHER PUBLICATIONS

Wright, C., & Serguieva, A. (2017, December). Sustainable blockchain-enabled services: Smart contracts. In 2017 IEEE International Conference on Big Data (Big Data) (pp. 4255-4264). IEEE. (Year: 2017).*

* cited by examiner

Primary Examiner — Thomas J Dailey
(74) Attorney, Agent, or Firm — Greenberg Traurig, LLP (57) ABSTRACT

An example method of configuring a plurality of aspects of a system includes providing, by a computing system, a control smart contract and a plurality of subordinate smart contracts on a blockchain, wherein each subordinate smart contract receives a respective input regarding a respective one of the plurality of aspects and outputs a respective decision, and wherein the control smart contract controls a configuration process incorporating the subordinate contracts according to the decisions of the subordinate contracts. The method further includes conducting, by a computing system, the configuration process according to the control smart contract; and configuring the aspects of the system according to the decisions of the subordinate smart contracts.

24 Claims, 6 Drawing Sheets

SYSTEM CONFIGURATION BASED ON SMART CONTRACTS

TECHNICAL FIELD

The instant disclosure relates to decision-making based on smart contracts, including a control smart contract and a plurality of subordinate smart contracts.

BACKGROUND

The form and operations of a smart contract, as well as the inputs to and outputs from the smart contract, may be stored on a blockchain, may be transparent to entities with access to the blockchain, and may be subject to a consensus process among blockchain nodes. Accordingly, such smart contracts may be used to execute trusted decision-making processes in which participants in the decision-making process, or entities affected by the decision-making process, can audit the process and the decision and be reassured that the process and the decision are conducted in an appropriate manner.

DETAILED DESCRIPTION

Systems, such as computing systems, have associated privacy policies and user monitoring policies, among other configuration aspects. The configuration of such policies for a system are generally determined by an owner or administrator of the system and may not be known by or visible to other participants of the system, such as users of the system. As an alternative to owner- or administrator-imposed policies, the participants in the system may collectively determine the configuration of one or more policies according to the present disclosure.

The participants in a system may collectively determine the configuration of one or policies of the system by participating in a cryptographic voting process. The cryptographic voting process may be conducted using a plurality of smart contracts, which smart contracts may include a control contract and a plurality of subordinate contracts. Each subordinate contract may collect votes respective of a given system configuration aspect, and the control contract may conduct the voting process based on the outputs of the subordinate smart contracts. The smart contracts and the results of each subordinate smart contract may be stored on a blockchain and exposed to the participants, thereby ensuring participant trust in the voting process and outcomes.

More generally, decisions may be made using a plurality of smart contracts, including a control contract and a plurality of subordinate contracts. Each subordinate contract may collect inputs respective of a particular issue or aspect, and the control contract may conduct a decision-making process according to the outputs of subordinate contracts. As noted above, the smart contracts and the results of each subordinate smart contract may be stored on a blockchain and exposed, thereby ensuring trust in the decision-making process and outcomes. In addition to systems configurations, decision-making processes according to the present disclosure may include execution of trusted transactions, such as transactions involving private data or the transfer or rights, such as property rights.

Figure 1:
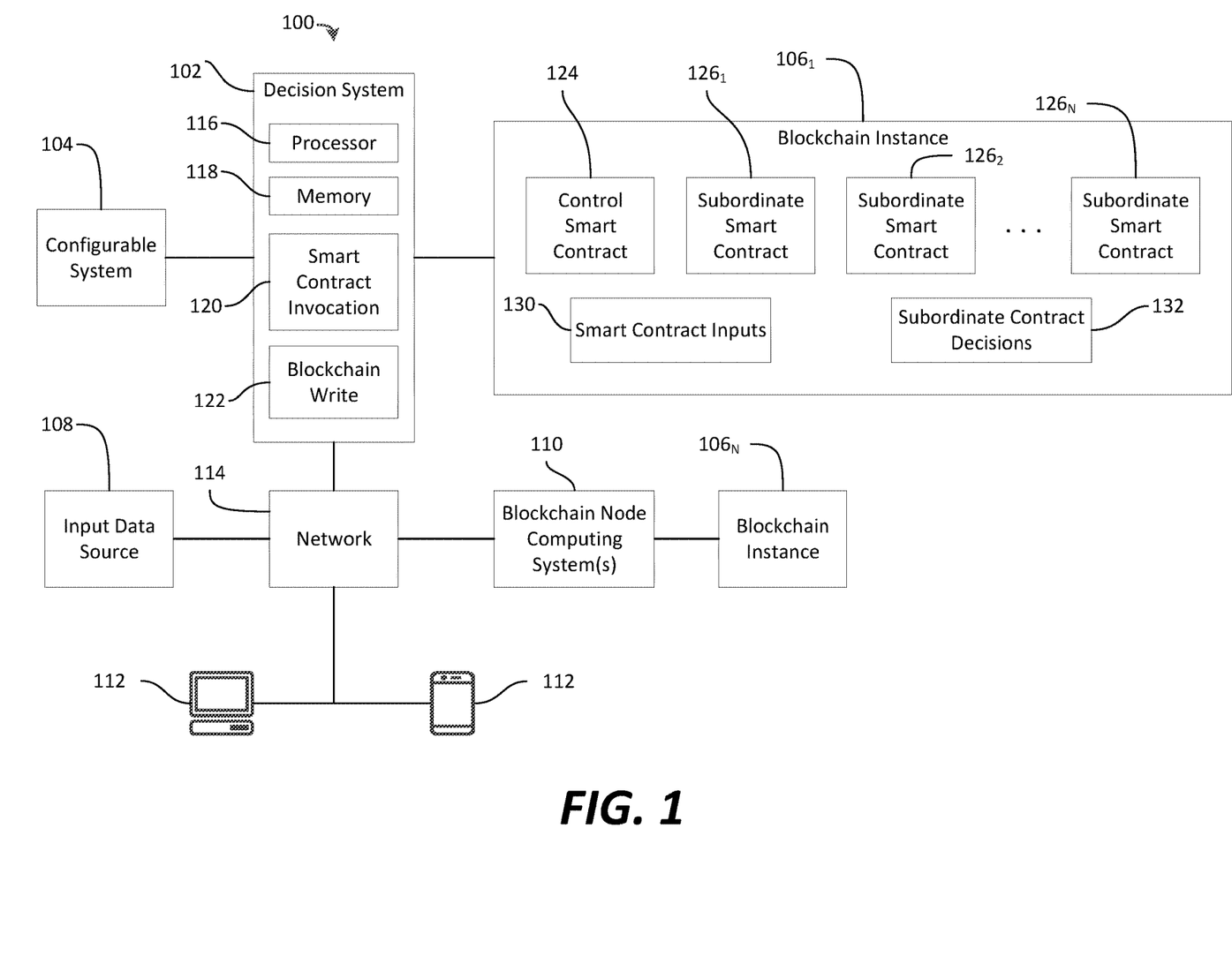
FIG. 1 is a block diagram view of an example system for decision making according to a plurality of smart contracts.

Referring to the drawings, wherein like reference numerals refer to the same or similar features in the various views, FIG. 1 is a block diagram view of an example system 100 for decision making according to a plurality of smart contracts. The system 100 may include a decision system 102, a configurable system 104, a data storage storing a blockchain instance 106₁, an input data source 108, one or more blockchain node computing systems 110, each connected to a respective blockchain instance $110_N$, and a plurality of user computing devices 112. The decision system 102, input data source 108, blockchain node computing systems 110, and user computing devices 112 may be in electronic communication with each other through a network 114.

The decision system 102 may include a processor 116 and a non-transitory, computer-readable memory 118 storing instructions that, when executed by the processor 116, cause the decision system 102 to perform one or more of the steps, processes, methods, operations, etc. described herein with respect to the decision system 102. The decision system 102 may include one or more functional modules embodied in the memory. The functional modules may include a smart contract invocation module 120, which may invoke one or more smart contracts and mediate facilitate input to, and output from, those smart contracts, and a blockchain write module 122, which may add data (e.g., smart contract inputs 130 and/or decisions 132 of one or more smart contracts) to a blockchain in association with the smart contracts invoked by the smart contract invocation module 120, for example. Further detail regarding example operations of the a smart contract invocation module 120 and blockchain write module 122 are provided below.

The blockchain instance 106₁ may store a plurality of smart contracts 124, 126, including a control smart contract 124 and a plurality of subordinate smart contracts $126_1$, $126_2$, . . . , $126_N$, which may be referred to individually as a subordinate smart contract 126 or collectively as the subordinate smart contracts 126. Each subordinate smart contract 126, when executed, may receive inputs and may, based on the received inputs, output a decision. The control smart contract 124, when executed, may conduct a decision-making process in which the control smart contract 124 invokes a sequence of subordinate smart contracts 126. The control smart contract 124 may invoke a first subordinate contract $126_1$ and, based on decision of the first subordinate smart contract $126_1$, invoke a second subordinate smart contract $126_2$. Based on the decision of the second subordinate smart contract $126_2$, the control smart contract 124 may invoke a third subordinate smart contract $126_3$, and so on.

Figure 2:
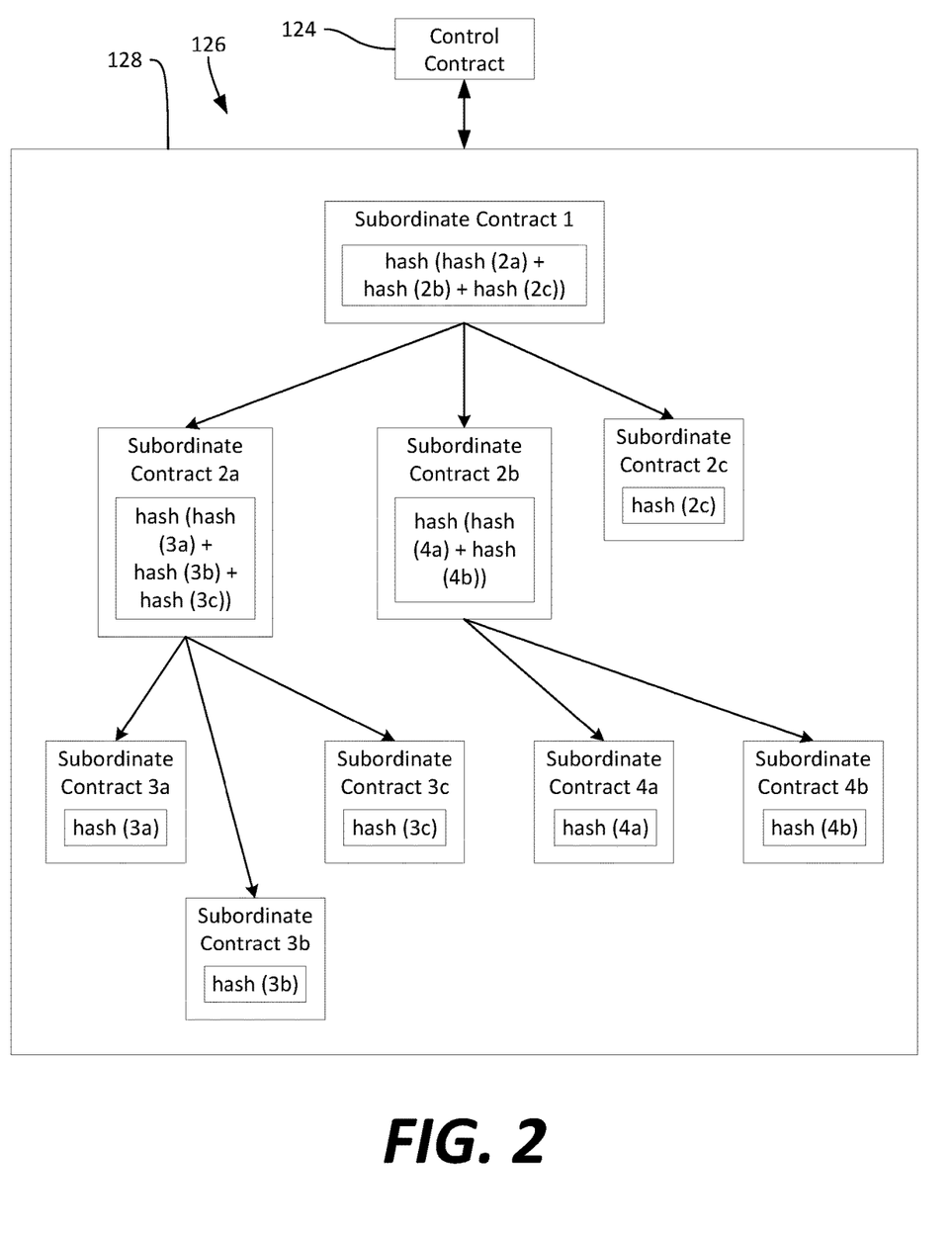
FIG. 2 is a block diagram view of a Merkle tree of smart contracts.

Referring to FIG. 2, the subordinate smart contracts 126 may be arranged and stored on the blockchain in a nested form, such as the form of a Merkle tree 128, in some embodiments. The control smart contract 124 may be outside of the Merkle tree, but may exchange data with the subordinate smart contracts 126. FIG. 2 illustrates a simplified Merkle tree 128. In a Merkle tree 128, each leaf node (e.g., subordinate smart contracts 2c, 3a, 3b, 3c, 4a, and 4b) is labeled with a hash of a respective data value, and each non-leaf node is labeled with a hash of the hashes of its dependent nodes. In the example of FIG. 2, leaf nodes of subordinate contracts 2c, 3a, 3b, 3c, 4a, and 4b are labeled with hashes of respective data values. Those hashes are indicated in FIG. 2 as hash (3a), hash (3b), and so on. In turn, subordinate contract 2a, which has subordinate contracts 3a, 3b, and 3c as its dependent nodes, is labeled with a hash of the combined labels of subordinate contracts 3a, 3b, and 3c. Similarly, subordinate contract 2b, which has subordinate contracts 4a and 4b as dependent nodes, is labeled with a hash of the combined labels of subordinate contracts 4a and 4b. Finally, subordinate contract 1, which has subordinate contracts 2a, 2b, and 2c as dependent nodes, is labeled with a hash of the combined labels of subordinate contracts 2a, 2b, and 2c. As a result, the full extent of the subordinate contracts, and the dependencies between them, are transparently provided on the blockchain for audit and review by those with access to the blockchain.

The control smart contract 124 may be programmed with knowledge of the inputs needed by, and outputs possible from, each subordinate smart contract 126. Accordingly, the programming of the control smart contract 124, accessible on the blockchain, may make the correct procession from one subordinate smart contract 126 to the next predictable by all with access to the blockchain given a certain set of inputs.

Referring again to FIG. 1, the decision system 102 may perform a decision-making process according to the smart contracts 124, 126 on the blockchain 106. Accordingly, the smart contract invocation module 120 may invoke (e.g., execute) the control smart contract 124, and, based on the output of the control smart contract 124, invoke (e.g., execute) a sequence of subordinate smart contracts 126.

Each subordinate smart contract 126 may be programmed to generate a decision based on a respective one or more inputs. The smart contract invocation module 120 may obtain the needed inputs for each executed subordinate smart contract 126, in some embodiments. For example, the smart contract invocation module 120 may obtain input data from the one or more input data sources 108. The input data in the input data sources 108 may be or may include, for example, one or more static or dynamic data sources. The input data in the input data sources 108 may be or may include, for example, public or private data. Example processes for decision making according to the smart contracts will be described below with respect to FIGS. 3, 4, and 5.

In some embodiments, a decision-making process executed by the decision system 102 may determine one or more configurable aspects of the configurable system 104. The configurable system 104 may be or may include a computing system such as, for example, a server system. The decision system may instruct configuration of aspects of the configurable system according to the decision-making process executed according to the smart contracts 124, 126.

The configurable aspects of the configurable system 104 may include, for example, a selection of a party to monitor the system 104, a selection of a methodology for monitoring the system 104, a selection of a party to control access to the system 104, a selection of a methodology for controlling access to the system 104, one or more aspects of a privacy policy of the configurable system 104, one or more aspects of a monitoring policy of the configurable system 104, one or more data processing geographic locations for particular data or data types processed by the configurable system 104, one or more revisions to the configurable system 104, and so on.

A decision-making process according to the smart contracts 124, 126 may, in some embodiments, incorporate a cryptographic voting process. In such a process, each subordinate smart contract 126 may accept votes from a plurality of user computing devices 112, with each vote selecting an option for a particular issue, such as a particular configurable aspect of the configurable system 104. The decision system 102 may transmit vote options to, and receive votes from, the user computing devices 112. An example method of configuring a system according to a smart contract-based cryptographic voting process is described below with respect to FIG. 5.

The blockchain write module 122 may write data to the blockchain 106. For example, the blockchain write module 122 may write the inputs 130 to the subordinate smart contracts to the blockchain 106. Additionally or alternatively, the blockchain write module 122 may add the decisions 132 of the subordinate smart contracts to the blockchain.

The system 100 may include one or more additional blockchain node computing systems 110, each associated with a respective copy of the blockchain $106_N$. Each blockchain node computing system 110 may participate in a consensus process in which all blockchain node computing systems 110 agree on the correct present state of the blockchain 106. In some embodiments, the decision system 102 may be, or may be part of, a blockchain node computing system 110. In some embodiments, the blockchain write module 122 may initiate or participate in a consensus process for adding data to the blockchain 106.

Although a single processor 116 and single memory 118 are illustrated for the decision system 102, the decision system 102 may include multiple processors 116 and/or multiple memories 118 that jointly or separately embody the functions of the correspondence system 102 and resource server system 104. Descriptions herein of a memory storing, or of a processor executing, instructions should be understood to encompass such embodiments.

Figure 3:
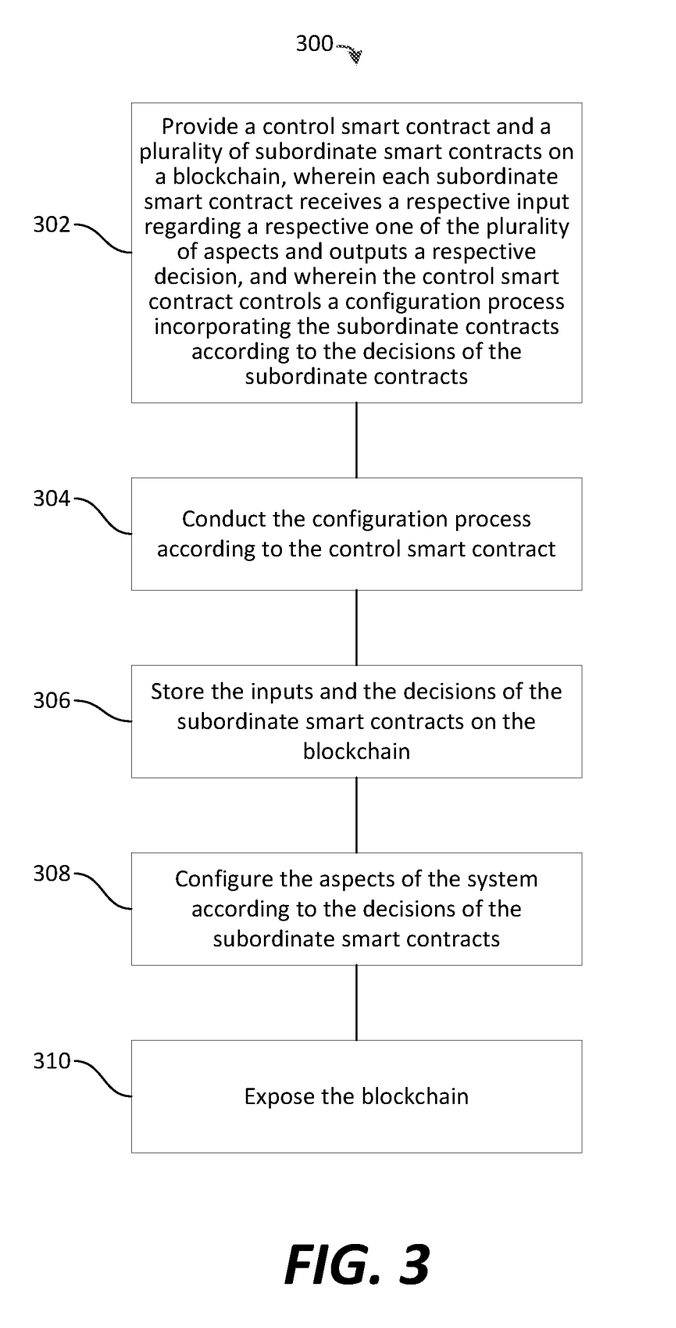
FIG. 3 is a flow chart illustrating an example method of configuring a system according to plurality of smart contracts.

FIG. 3 is a flow chart illustrating an example method 300 of configuring a plurality of aspects of a system according to plurality of smart contracts. The method 300, or one or more portions of the method 300, may be performed by the decision system 102, in some embodiments.

The method 300 may include, at block 302, providing a control smart contract and a plurality of subordinate smart contracts on a blockchain. Each subordinate smart contract may receive a respective input regarding a respective one of a plurality of aspects of a system and may output a respective decision. The control smart contract may control a configuration process incorporating the subordinate contracts according to the decisions of the subordinate smart contracts. Block 302 may include propagating the control smart contract and/or one or more of the plurality of subordinate smart contracts throughout the network of the blockchain for addition to a plurality of instances of the blockchain, in some embodiments.

The method 300 may further include, at block 304, conducting a configuration process according to the control smart contract. Block 304 may include receiving inputs by a respective one of the subordinate smart contracts, outputting a decision by the respective one of the subordinate smart contracts according to the received inputs, and advancing, by the control smart contract, to a next one of the subordinate smart contracts according to the output decision of the respective one of the subordinate smart contracts. The configuration process may include advancing to additional subordinate smart contracts, according to the decisions of previously-invoked smart contracts, until the sequence of subordinate smart contracts is complete.

In some embodiments, the sequence of subordinate smart contracts utilized in the configuration process of block 304 may be fewer than the total set of subordinate smart contracts available for use in the configuration process. For example, as will be discussed below in an example with respect to FIG. 2, some configuration process embodiments may include one or more subordinate smart contracts with exclusive outcomes, such that certain outcomes of one subordinate smart contract prohibits at least one other subordinate smart contract from being invoked and executed. In other embodiments, the control smart contract may define a desired level of granularity or precision for a decision, or may otherwise impose a minimum or maximum limitation on the quantity of subordinate smart contracts that are invoked in a given decision-making process.

Referring to FIG. 2, an example of block 304 will be explained. A configuration process utilizing the Merkle tree 128 may begin with the control contract 124 being executed and the control contract invoking subordinate smart contract 1. Subordinate smart contract 1 may have three potential outputs. In some embodiments, multiple potential outputs of subordinate contract 1 and/or other subordinate contracts are exclusive of one another. In other embodiments, multiple potential outputs of subordinate contract 1 and/or other subordinate contracts may be additive.

Once subordinate contract 1 is invoked, one or more required inputs may be gathered and input to subordinate contract 1. Based on those inputs, subordinate smart contract 1 may generate one or more of its three potential outputs. The output(s) of subordinate smart contract 1 may be input to the control smart contract 124.

Based on the output(s) of subordinate smart contract 1, the control smart contract may invoke one or more of subordinate smart contracts 2a, 2b, and 2c. As an illustration, consider an example in which subordinate smart contract has potential outputs A, B, and C. Where subordinate smart contract 1 outputs A, the control smart contract may then invoke subordinate smart contract 2a. Where subordinate smart contract 1 outputs B, the control smart contract may then invoke subordinate smart contract 2b. Where subordinate smart contract 1 outputs C, the control smart contract may then invoke subordinate smart contract 2c.

Consider further an example in which subordinate smart contract 1 outputs A, to the exclusion of potential outputs B and C, and the control smart contract 124 therefore invokes subordinate smart contract 2a, but not subordinate smart contracts 2b or 2c. Subordinate smart contract 2a may receive its own inputs and generate one or more of three potential outputs AA, AB, and AC. Where subordinate smart contract 2a outputs AA, the control smart contract 124 may then invoke subordinate smart contract 3a. Where subordinate smart contract 2a outputs AB, the control smart contract 124 may then invoke subordinate smart contract 3b. Where subordinate smart contract 2a outputs AC, the control smart contract 124 may then invoke subordinate smart contract 3c.

Finally, consider an example in which subordinate smart contract outputs AB, to the exclusion of AA and AC. The control smart contract therefore invokes subordinate smart contract 3b, and not 3a or 3c. Subordinate smart contract 3b may have its own set of potential outputs—for example, ABA or ABB. Subordinate smart contract 3b may receive its own set of inputs and output ABA, for example.

Although the example described above includes a single first subordinate smart contract 1, and a single subordinate smart contract 126 executing at a time, a different example may include multiple first subordinate smart contracts 126 executing simultaneously or independently from each other, and/or multiple subordinate smart contracts 126 executing at a given level simultaneously or independently.

Returning to FIG. 3, the method 300 may further include, at block 306, adding the inputs and the decisions of the subordinate smart contracts on the blockchain. Referring to the example given above with respect to FIG. 2, block 306 may include adding the inputs to subordinate smart contracts 1, 2a, and 3b, as well as the respective outputs of subordinate contracts 1, 2a, and 3b, namely, A, AB, and ABA, to the blockchain. In some embodiments, block 306 may include initiating, conducting, and/or participating in a consensus process with one or more other blockchain node computing systems, in which multiple blockchain nodes agree that the correct inputs and correct outputs are added to the blockchain.

The method 300 may further include, at block 308, configuring the aspects of the system according to the decisions of the subordinate smart contracts. In the example above, outputs A, AB, and ABA may dictate certain configuration aspects of a configurable system, and block 308 may include causing those configuration aspects to be implemented, such as by transmitting an instruction to the configurable system to implement the configuration aspects, by installing or causing to be installed, or activating or causing to be activated, one or more programs on a configurable computing system that implements one or more of the decisions of the subordinate smart contracts.

The method 300 may further include, at block 310, exposing the blockchain. The blockchain may be exposed to participants in the configurable system such as, for example, users, proprietors, and/or regulators of the configurable system. As a result, the process for implementing the configuration process may be transparent and auditable to those participants. In some embodiments, the blockchain may be exposed to the public. In some embodiments, the blockchain may be exposed before or during the operations of block 304. In other embodiments, the blockchain may be exposed after the operations of block 304.

Figure 4:
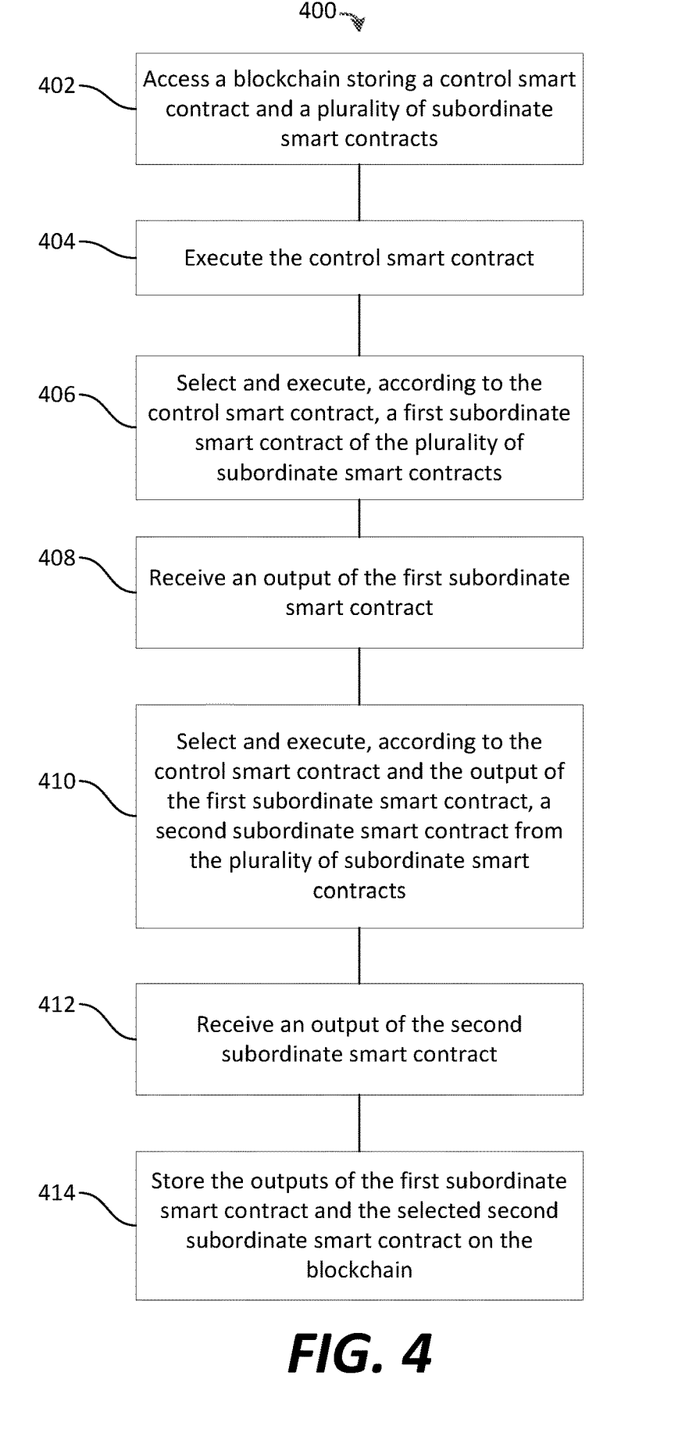
FIG. 4 is a flow chart illustrating an example method of configuring a system according to plurality of smart contracts.

FIG. 4 is a flow chart illustrating an example method 400 of decision making according to a plurality of smart contracts. The method 400, or one or more portions of the method 400, may be performed by the decision system 102, in some embodiments.

The method 400 may include, at block 402, accessing a blockchain storing a control smart contract and a plurality of subordinate smart contracts. The blockchain may be a public blockchain or a private blockchain. The control smart contract and subordinate smart contract may be as described throughout this disclosure.

The method 400 may further include, at block 404, executing the control smart contract. As described herein, the control smart contract may govern the procession of decision making from one subordinate smart contract to another.

The method 400 may further include, at block 406, selecting and executing, according to the control smart contract, a first subordinate smart contract of the plurality of subordinate smart contracts. In some embodiments, block 406 may include obtaining one or more inputs for the first subordinate smart contract and inputting the one or more inputs into the first subordinate smart contract. In some embodiments, obtaining the one or more inputs may include prompting one or more users to provide the one or more inputs, and receiving the one or more inputs from the one or more users. For example, user inputs may be collected as part of a cryptographic voting process, as will be described below with respect to FIG. 5.

The method 400 may further include, at block 408, receiving an output of the first subordinate smart contract and, at block 410, selecting and executing, according to the control smart contract and the output of the first subordinate smart contract, a second subordinate smart contract from the plurality of subordinate smart contracts. Block 410 may include inputting the output of the first subordinate smart contract to the control smart contract. Based on the output of the first subordinate smart contract, the control smart contract may output information of the next subordinate smart contract to be executed.

In some embodiments, block 410 may include obtaining one or more inputs for the second subordinate smart contract and inputting the one or more inputs into the second subordinate smart contract. The one or more inputs for the second subordinate smart contract may be different from the inputs obtained for the first subordinate smart contract, in some embodiments. In other embodiments, some or all of the inputs for the first subordinate smart contract may also be used as inputs for the second subordinate smart contract. In some embodiments, obtaining the one or more inputs for the second subordinate smart contract may include prompting one or more users to provide the one or more inputs, and receiving the one or more inputs from the one or more users. For example, user inputs may be collected as part of a cryptographic voting process, as will be described below with respect to FIG. 5.

The method 400 may further include, at block 412, receiving an output of the second subordinate smart contract and, at block 414, storing the outputs of the first subordinate smart contract and the selected second subordinate smart contract on the blockchain. Storing the outputs of the first and second subordinate smart contracts may include, in some embodiments, initiating and/or participating in a consensus process among a plurality of nodes of the blockchain. In such a consensus process, the computing system performing the operations of the method 400 may distribute, to one or more nodes of the blockchain, the inputs to the subordinate smart contracts and the received outputs of the subordinate smart contracts.

Figure 5:
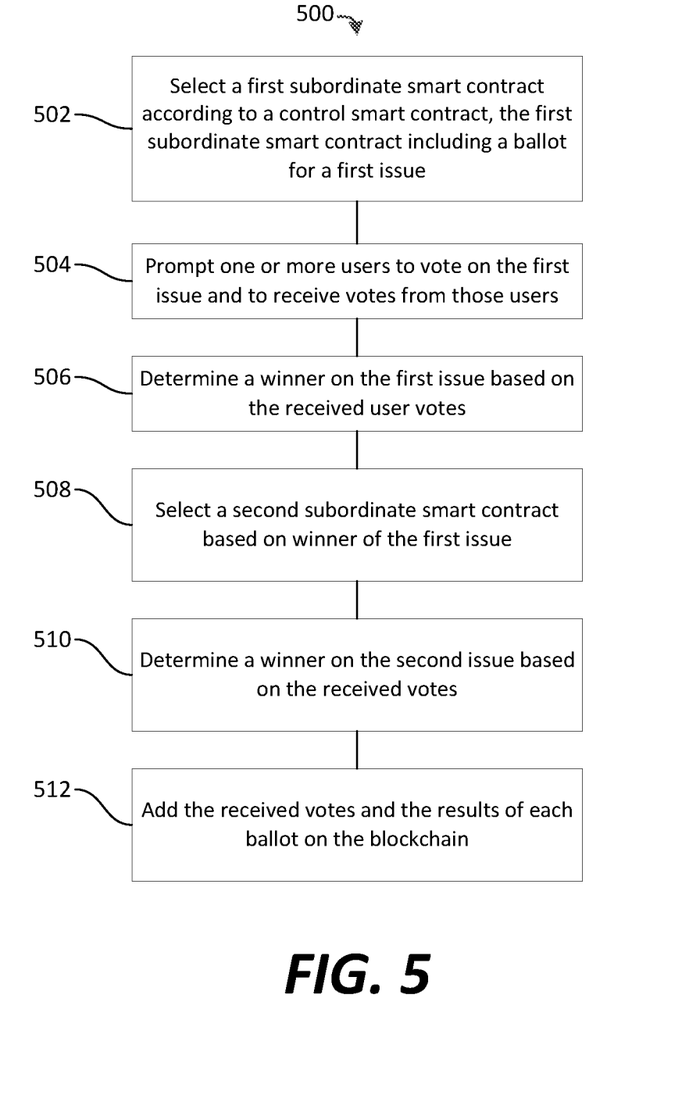
FIG. 5 is a flow chart illustrating an example method of configuring a system according to a cryptographic voting process using a plurality of smart contracts.

FIG. 5 is a flow chart illustrating an example method 500 of configuring a system according to a cryptographic voting process using a plurality of smart contracts. The method 500, or one or more portions of the method 500, may be performed by the decision system 102, in some embodiments.

The method 500 may include, at block 502, selecting a first subordinate smart contract according to a control smart contract, the first subordinate smart contract including a ballot for a first issue. The first subordinate smart contract, when executed, may therefore conduct an election as to the first issue. The first issue may be, for example, a configurable aspect of a configurable system.

The method 500 may further include, at block 504, prompting one or more users to vote on the first issue and to receive votes from those users. Block 504 may include transmitting the ballot of the first subordinate smart contract to each of the users and receiving each user's vote in response.

In some embodiments, block 504 may include, or the method 500 may otherwise include, distributing a respective private key to each user with which the user may decrypt a ballot and encrypt the user's vote, or with which the user may decrypt a symmetric public key that the user then uses to encrypt the user's vote. The system administering the vote (e.g., the system performing the method 500, or performing the step 504) may possess a public key associated with the user's private key, and/or a public key associated with the user's symmetric public key. At block 504, the system may use the public key to encrypt the user's ballot, to decrypt the user's vote, and/or to encrypt a proof of right to vote. In some embodiments, the user's private key may be used to demonstrate right-to-vote in a form other than decryption of the ballot itself. As will be described below after the method 500, such a distributed private key may also be used in connection with other applications of the instant disclosure that do not involve cryptographic voting.

In some embodiments, ballots may be distributed, and votes received, from many types of participants of a system to be configured according to the voting process. For example, such participants may include users of the system, proprietors of the system, and/or regulators of the system. Votes of different participants, or different participant types, may be weighted, in some embodiments. For example, the weight associated with a given vote may be encoded into the participant's private key.

In some embodiments, block 504 may include defining a number of voters, each receiving a generated random value or other private key $x_i$, and broadcasting the ballot g for to be filled by the holder of each $x_i$, as shown in equation (1) below:

$$\text{Public}_i = g^{x_i} \bmod p \tag{Eq. 1}$$

where p may be a unique prime number for the particular ballot.

Private key $x_i$ should not be derivable given public key $\text{Public}_i$. Each voter keeps their $x_i$ value secret, and will use $x_i$ to prove to the system conducting the voting process to of their ID, roles and rights using zero-knowledge proof, in some embodiments.

All the votes may regenerate a set of private keys based on all the public keys, as shown in equation (2) below:

$$g^{y_i} = \frac{\prod_{j=1}^{i-1} g^{x_j}}{\prod_{j=(i+1)}^{n} g^{x_j}} \tag{Eq. 2}$$

ensuring that equation (3) below is accurate:

$$\prod_{i=1}^{n} g^{x_i y_i} (\bmod p) = 1 \tag{Eq. 3}$$

Voters vote according to equation (4) below:

$$g^{y_i * x_i} * g^{v_i} (\bmod p) \tag{Eq. 4}$$

where $v_i$=vote for voter i.

Each voter can provide a verifiable hash H of their vote ($v_i$), as shown in equation (5) below:

$$\text{Verification}_i = H(g^{x_i y_i} g^{v_i})(\bmod p) \tag{Eq 5}$$

The method 500 may further include, at block 506, determining a winner on the first issue based on the received user votes. Determining the winner may include decrypting each voter's vote according to one or more public keys.

Block 506 may include computing a sum of votes according to equation (6) below:

$$g^{sum\ of\ votes} = g^{\sum_{i=1}^{i=n} v_i} = \prod_{i=1}^{i=n} g^{y_i * x_i} * g^{v_i} (mod\ p) \quad \text{(Eq. 6)}$$

where n=the number of voters.

Determining the winner may include computing a weighted vote total for each potential outcome on the ballot, in some embodiments. Accordingly, the sum of votes can be weighted with a weight $w_i$ for each voter i. For example, each voter of a given participant group k may have the same weight $w_k$, such that the weighted vote total from that participant group may be calculated as $w_k * sum\_of\_votes_k$.

The method 500 may further include, at block 508, selecting a second subordinate smart contract based on winner of the first issue. The second subordinate smart contract may include a ballot for a second issue. Voting on the second issue may proceed as discussed above with respect to the first issue. The same voters, or different voters, may be prompted and may cast votes on the second issue as in the first issue. As described herein, the second subordinate smart contract may be selected by the control smart contract based on a decision output by the first subordinate smart contract.

The method 500 may further include, at block 510, determining a winner on the second issue based on the received votes. Determining a winner for the second issue may proceed as set forth with respect to block 506 above.

The method 500 may further include selecting and executing subsequent subordinate smart contracts according to the decisions of prior smart subordinate smart contracts.

The method 500 may further include, at block 512, adding the received votes and the results of each ballot on the blockchain. As described throughout this disclosure, storing the votes and results may include prompting or participating in a consensus process among nodes of the blockchain.

Cryptographic voting may advantageously ensure that votes may be made anonymously and after the votes have been cast and collated, each participant can view and attest the result.

Methods and systems according to the present disclosure may have numerous applications. For example, a decision-making or configuration process according to the present disclosure may include distribution of a private key to a user, and that private key may be used by the user to engage in trusted transactions. For example, the user may provide their private key in connection with an instruction by the user to transfer the user's private data (e.g., medical records) from one holder to another. The user may be prompted to provide their private key in a manner similar to that set forth above with respect to cryptographic voting, and the user may provide their private key as a proof of ownership in the private data. Aspects of the decision-making process for transferring the data—the recipient of the transfer "from" instruction (e.g., the original holder of the private data), the recipient of the transfer "to" instruction (e.g., the intended new holder of the private data), the manner of transfer, the date of transfer, the quantity of data to transfer (e.g., some of the private data of the user held by the original holder, or all of the private data of the user held by the holder), the prompt to the user to provide their private key and confirmation of the correspondence of the user's private key with an associated public key, etc.—may be implemented in one or more subordinate smart contracts, with a control smart contract executing the transfer process according to the outputs of the subordinate smart contracts. Such a transfer process may proceed generally according to an embodiment of the method 400 of FIG. 4 (e.g., additionally including the private key aspects of the method 500), for example.

In another example, a trusted transaction may be executed according to the present disclosure and may involve the transfer of a right (e.g., a property right) from one party to another. Aspects of the decision-making process for the transaction—identification of the right, identification of a property that is the subject of the transaction, identification of one or more documents that document the right, confirmation of the transfer from the transferor of the right, confirmation of the transfer from the transferee of the right, etc.—may be implemented in one or more subordinate smart contracts, with a control smart contract executing the transaction according to the outputs of the subordinate smart contracts. Each transacting entity—e.g., the transferor and transferee—may be prompted to provide, and may provide, a private key as a proof of right to participate in the transaction, such as a proof of identification and/or proof of ownership. Such a trusted transaction may proceed generally according to an embodiment of the method 400 of FIG. 4 (e.g., additionally including the private key aspects of the method 500), for example.

Figure 6:
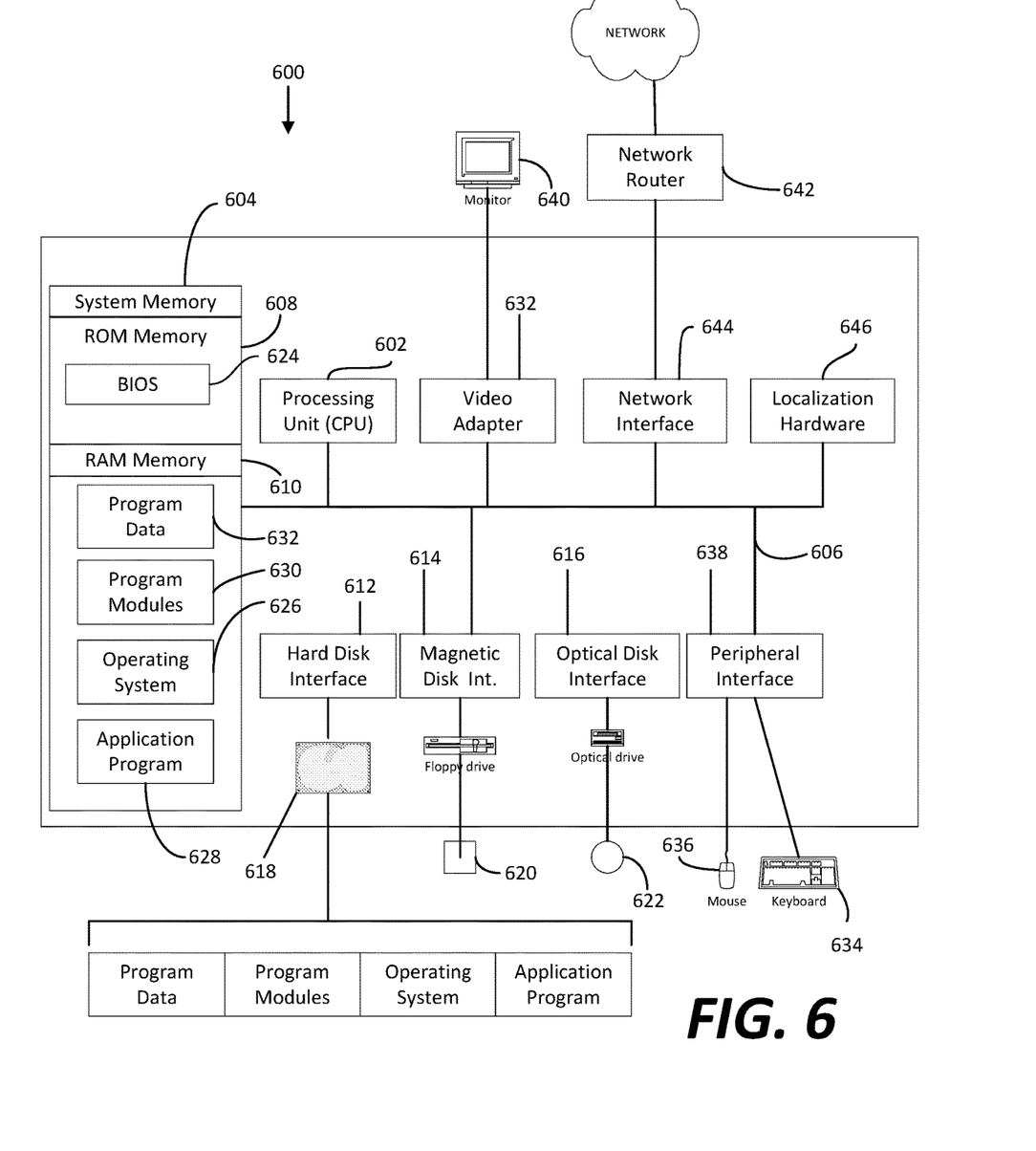
FIG. 6 is a flow chart illustrating an example method of configuring a system according to a cryptographic voting process using a plurality of smart contracts.

FIG. 6 is a block diagram of an example computing system 600, such as a desktop computer, laptop, smartphone, tablet, or any other such device having the ability to execute instructions, such as those stored within a non-transient, computer-readable medium. Furthermore, while described and illustrated in the context of a single computing system 600, those skilled in the art will also appreciate that the various tasks described hereinafter may be practiced in a distributed environment having multiple computing systems 600 linked via a local or wide-area network in which the executable instructions may be associated with and/or executed by one or more of multiple computing systems 600.

In its most basic configuration, computing system environment 600 typically includes at least one processing unit 602 and at least one memory 604, which may be linked via a bus 606. Depending on the exact configuration and type of computing system environment, memory 604 may be volatile (such as RAM 610), non-volatile (such as ROM 608, flash memory, etc.) or some combination of the two. Computing system environment 600 may have additional features and/or functionality. For example, computing system environment 600 may also include additional storage (removable and/or non-removable) including, but not limited to, magnetic or optical disks, tape drives and/or flash drives. Such additional memory devices may be made accessible to the computing system environment 600 by means of, for example, a hard disk drive interface 612, a magnetic disk drive interface 614, and/or an optical disk drive interface 616. As will be understood, these devices, which would be linked to the system bus 606, respectively, allow for reading from and writing to a hard disk 618, reading from or writing to a removable magnetic disk 620, and/or for reading from or writing to a removable optical disk 622, such as a CD/DVD ROM or other optical media. The drive interfaces and their associated computer-readable media allow for the nonvolatile storage of computer readable instructions, data structures, program modules and other data for the computing system environment 600. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 600.

A number of program modules may be stored in one or more of the memory/media devices. For example, a basic input/output system (BIOS) 624, containing the basic routines that help to transfer information between elements within the computing system environment 600, such as during start-up, may be stored in ROM 608. Similarly, RAM 610, hard drive 618, and/or peripheral memory devices may be used to store computer executable instructions comprising an operating system 626, one or more applications programs 628, other program modules 630, and/or program data 632. Still further, computer-executable instructions may be downloaded to the computing environment 600 as needed, for example, via a network connection. The applications programs 628 may include, for example, one or more of the decision system modules, such as the smart contract invocation module and/or the blockchain write module, in some embodiments.

An end-user may enter commands and information into the computing system environment 600 through input devices such as a keyboard 634 and/or a pointing device 636. While not illustrated, other input devices may include a microphone, a joystick, a game pad, a scanner, etc. These and other input devices would typically be connected to the processing unit 602 by means of a peripheral interface 638 which, in turn, would be coupled to bus 606. Input devices may be directly or indirectly connected to processor 602 via interfaces such as, for example, a parallel port, game port, firewire, or a universal serial bus (USB). To view information from the computing system environment 600, a monitor 640 or other type of display device may also be connected to bus 606 via an interface, such as via video adapter 632. In addition to the monitor 640, the computing system environment 600 may also include other peripheral output devices, not shown, such as speakers and printers.

The computing system environment 600 may also utilize logical connections to one or more computing system environments. Communications between the computing system environment 600 and the remote computing system environment may be exchanged via a further processing device, such a network router 642, that is responsible for network routing. Communications with the network router 642 may be performed via a network interface component 644. Thus, within such a networked environment, e.g., the Internet, World Wide Web, LAN, or other like type of wired or wireless network, it will be appreciated that program modules depicted relative to the computing system environment 600, or portions thereof, may be stored in the memory storage device(s) of the computing system environment 600.

The computing system environment 600 may also include localization hardware 646 for determining a location of the computing system environment 600. In embodiments, the localization hardware 646 may include, for example only, a GPS antenna, an RFID chip or reader, a WiFi antenna, or other computing hardware that may be used to capture or transmit signals that may be used to determine the location of the computing system environment 600.

The computing system, or one or more portions thereof, may embody a user computing device 112, in some embodiments. Additionally or alternatively, some components of the computing system 600 may embody the decision system 102 and/or blockchain node computing system(s) 110.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method of configuring a plurality of aspects of a system, the method comprising:
   accessing a blockchain storing a control smart contract and a plurality of subordinate smart contracts;
   executing the control smart contract;
   selecting and executing, according to the control smart contract, a first subordinate smart contract of the plurality of subordinate smart contracts;
   receiving an output of the first subordinate smart contract;

selecting and executing, according to the control smart contract and the output of the first subordinate smart contract, a second subordinate smart contract from the plurality of subordinate smart contracts, wherein different outputs of the first subordinate smart contract result in selection of different second subordinate smart contracts;

receiving an output of the second subordinate smart contract; and storing the outputs of the first subordinate smart contract and the selected second subordinate smart contract on the blockchain.

2. The method of claim 1, wherein the subordinate smart contracts are stored on the blockchain as a Merkle tree.

3. The method of claim 1, wherein executing the first subordinate smart contract comprises obtaining one or more inputs for the first subordinate smart contract and inputting the one or more inputs into the first subordinate smart contract.

4. The method of claim 3, wherein obtaining the one or more inputs comprises:

prompting one or more users to provide the one or more inputs; and receiving the one or more inputs from the one or more users.

5. The method of claim 3, further comprising:

storing the one or more inputs on the blockchain.

6. The method of claim 3, wherein the one or more inputs are first one or more inputs, wherein executing the second subordinate smart contract comprises obtaining a second one or more inputs, different from the first one or more inputs, and inputting the second one or more inputs to the second subordinate smart contract.

7. The method of claim 6, wherein obtaining the second one or more inputs comprises:

prompting one or more users to provide the second one or more inputs; and receiving the second one or more inputs from the one or more users.

8. The method of claim 6, further comprising:

storing the second one or more inputs on the blockchain.

9. A computer system comprising:

a processor; and a non-transitory, computer-readable medium storing instructions that, when executed by the processor, cause the computer system to perform operations comprising:

accessing a blockchain storing a control smart contract and a plurality of subordinate smart contracts;

executing the control smart contract;

selecting and executing, according to the control smart contract, a first subordinate smart contract of the plurality of subordinate smart contracts;

receiving an output of the first subordinate smart contract;

selecting and executing, according to the control smart contract and the output of the first subordinate smart contract, a second subordinate smart contract from the plurality of subordinate smart contracts, wherein different outputs of the first subordinate smart contract result in selection of different second subordinate smart contracts;

receiving an output of the second subordinate smart contract; and storing the outputs of the first subordinate smart contract and the selected second subordinate smart contract on the blockchain.

10. The computer system of claim 9, wherein the subordinate smart contracts are stored on the blockchain as a Merkle tree.

11. The computer system of claim 9, wherein executing the first subordinate smart contract comprises obtaining one or more inputs for the first subordinate smart contract and inputting the one or more inputs into the first subordinate smart contract.

12. The computer system of claim 11, wherein obtaining the one or more inputs comprises:

prompting one or more users to provide the one or more inputs; and receiving the one or more inputs from the one or more users.

13. The computer system of claim 11, the operations further comprising:

storing the one or more inputs on the blockchain.

14. The computer system of claim 11, wherein the one or more inputs are first one or more inputs, wherein executing the second subordinate smart contract comprises obtaining a second one or more inputs, different from the first one or more inputs, and inputting the second one or more inputs to the second subordinate smart contract.

15. The computer system of claim 14, wherein obtaining the second one or more inputs comprises:

prompting one or more users to provide the second one or more inputs; and receiving the second one or more inputs from the one or more users.

16. The computer system of claim 14, the operations further comprising:

storing the second one or more inputs on the blockchain.

17. A non-transitory, computer-readable medium storing instructions that, when executed by a processor of a computer system, cause the computer system to perform operations comprising:

accessing a blockchain storing a control smart contract and a plurality of subordinate smart contracts;

executing the control smart contract;

selecting and executing, according to the control smart contract, a first subordinate smart contract of the plurality of subordinate smart contracts;

receiving an output of the first subordinate smart contract;

selecting and executing, according to the control smart contract and the output of the first subordinate smart contract, a second subordinate smart contract from the plurality of subordinate smart contracts, wherein different outputs of the first subordinate smart contract result in selection of different second subordinate smart contracts;

receiving an output of the second subordinate smart contract; and storing the outputs of the first subordinate smart contract and the selected second subordinate smart contract on the blockchain.

18. The computer-readable medium of claim 17, wherein the subordinate smart contracts are stored on the blockchain as a Merkle tree.

19. The computer-readable medium of claim 17, wherein executing the first subordinate smart contract comprises obtaining one or more inputs for the first subordinate smart contract and inputting the one or more inputs into the first subordinate smart contract.

20. The computer-readable medium of claim 19, wherein obtaining the one or more inputs comprises:

prompting one or more users to provide the one or more inputs; and receiving the one or more inputs from the one or more users.

21. The computer-readable medium of claim 19, the operations further comprising:
    storing the one or more inputs on the blockchain.

22. The computer-readable medium of claim 19, wherein the one or more inputs are first one or more inputs, wherein executing the second subordinate smart contract comprises obtaining a second one or more inputs, different from the first one or more inputs, and inputting the second one or more inputs to the second subordinate smart contract.

23. The computer-readable medium of claim 22, wherein obtaining the second one or more inputs comprises:
    prompting one or more users to provide the second one or more inputs; and
    receiving the second one or more inputs from the one or more users.

24. The computer-readable medium of claim 22, further comprising:
    storing the second one or more inputs on the blockchain.

* * * * *